United States Patent [19]

Wideman et al.

[11] Patent Number: 5,171,789
[45] Date of Patent: Dec. 15, 1992

[54] POLY(OXYDIPHENYLAMINES)

[75] Inventors: Lawson G. Wideman, Tallmadge; George F. Balogh, North Canton; Denise J. Keith, Akron, all of Ohio

[73] Assignee: The Goodyear Tire & Rubber Company, Akron, Ohio

[21] Appl. No.: 798,855

[22] Filed: Nov. 21, 1991

Related U.S. Application Data

[63] Continuation of Ser. No. 594,784, Oct. 9, 1990, abandoned.

[51] Int. Cl.$^5$ ............... C08C 19/20; C08J 5/06; C08J 5/13; C08L 71/10
[52] U.S. Cl. .................... 525/132; 524/244; 524/246; 525/151; 525/152; 525/346; 525/354; 525/380; 525/381
[58] Field of Search ......... 524/244, 246; 525/152, 525/346, 354, 380, 381, 132, 151

[56] References Cited

U.S. PATENT DOCUMENTS

| | | | |
|---|---|---|---|
| 4,334,044 | 6/1982 | Kotani et al. | 525/380 |
| 4,481,337 | 11/1984 | Burlett et al. | 525/340 |
| 4,946,879 | 8/1990 | Wideman et al. | 524/93 |

FOREIGN PATENT DOCUMENTS 2119231 5/1987 Japan.

*Primary Examiner*—James J. Seidleck
*Assistant Examiner*—Thomas Hamilton, III
*Attorney, Agent, or Firm*—Bruce J. Hendricks

[57] ABSTRACT

The present invention relates to poly(oxydiphenylamines) of the formula:

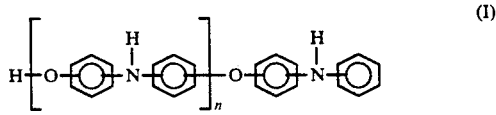

(I)

wherein n is an integer ranging from about 1 to 100. The poly(oxydiphenylamines) are useful as a rubber additive and have shown improvement in the tear strength of the rubber as measured by increased peel adhesion.

9 Claims, No Drawings

POLY(OXYDIPHENYLAMINES)

This is a continuation of copending application Ser. No. 07/594,784, filed on Oct. 9, 1990 now abandoned.

BACKGROUND OF THE INVENTION

The present invention relates to poly(oxydiphenylamines) which are useful as rubber additive.

SUMMARY OF THE INVENTION

The present invention relates to poly(oxydiphenylamines) of the formula:

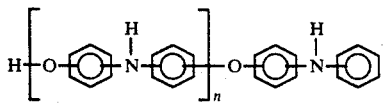
(I)

wherein n is an integer ranging from about 1 to 100.

DETAILED DESCRIPTION OF THE PREFERRED INVENTION

There is disclosed a poly(oxydiphenylamine) of the formula:

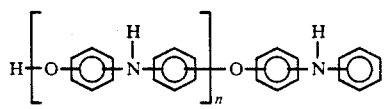
(I)

wherein n is an integer ranging from about 1 to 100. Preferably, the poly(oxydiphenylamine) is of the formula:

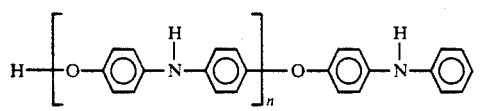
(II)

The term poly(oxydiphenylamine) is used herein to describe dimers (where n is 1), oligomers (where n is from about 2 to about 4) and polymers (where n is an integer of from 5 to 100).

The molecular weight of the poly(oxydiphenylamines) may range from about 370 to about 10,000. Preferably, the molecular weight will range from about 370 to about 1000. As can be appreciated after having read the present application, there may be dimers, oligomers and polymers in the crude reaction mixture which all will have different molecular weights within the above ranges.

There is also disclosed a rubber composition which comprises (1) a rubber selected from the group consisting of natural rubber, homopolymers of conjugated diolefins, copolymers of conjugated diolefins and ethylenically unsaturated monomers or mixtures thereof and a poly(oxydiphenylamine) of the formula:

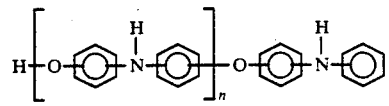
(I)

wherein n is an integer from about 1 to 100.

The poly(oxydiphenylamines) may be prepared by a number of methods. For example, the poly(oxydiphenylamines) may be prepared by the air oxidation of hydroxy diphenylamines. For example, the poly(oxydiphenylamines) may be prepared by reacting hydroxy diphenylamine with an oxygen containing gas such as air for a period of from about 1 day to about 30 days at a temperature ranging from about room temperature to about 200° C. In the alternative, the poly(oxydiphenylamines) may be prepared by heating a hydroxy diphenylamine in the presence of a catalyst to speed up the reaction. Examples of catalysts that may be used include acid catalysts such as sulfuric acid, hydrochloric acid and toluenesulfonic acid. The amount the catalyst that will be used will vary depending on the particular catalyst that is selected. For example, when an acid catalyst is used from about 1 to about 20 percent by weight of the hydroxydiphenylamine is recommended.

The reaction may be conducted over wide temperatures. For example, the temperature may range from about room temperature to an elevated temperature depending on the particular type of reaction that is selected. In general, the reaction may be conducted at a temperature of between about room temperature to about 220° C. The preferred temperature range is from about 100° C. to about 200° C., while the most preferred temperature range is from about 140° C. to about 180° C. If all reaction variables remain constant except the reaction temperature, it is believed that the reaction product will have varying reactivities in the rubber.

Examples of hydroxy diphenylamines which may be used include 4-hydroxydiphenylamine, 3-hydroxydiphenylamine and 2-hydroxydiphenylamine Preferably, the hydroxydiphenylamine is 4-hydroxydiphenylamine, and mixtures of the above.

An organic solvent may be used to dissolve the hydroxydiphenylamine. The solvent is preferably inert to the reaction. Illustrative of solvents suitable for use in the present invention include saturated and aromatic hydrocarbons, e.g., hexane, octane, dodecane, naphtha, decaline, tetrahydronaphthalene, kerosene, mineral oil, cyclohexane, cycloheptane, alkylcycloalkane, benzene, toluene, xylene, alkyl-naphthalene and the like: ethers such as tetrahydrofuran, tetrahydropyran, diethylene ether, 1,2-dimethoxybenzene, 1,2-diethoxybenzene, the mono- and dialkyl ethers of ethylene glycol, propylene glycol, butylene glycol, diethylene glycol, dipropylene glycol, oxyethylene oxypropylene glycol, and the like; fluorinated hydrocarbons that are inert under the reaction conditions such as perfluoroethane, monofluorobenzene and the like. Another class of solvents are sulfones such as dimethyl sulfone, diethyl sulfone, diphenol sulfone, sulfolane, and the like. Mixtures of the aforementioned solvents may be employed so long as they are compatible with each other under the conditions of the reaction and will adequately dissolve the hydroxydiphenylamine and not interfere with the reaction.

The process for the preparation of the poly(oxydiphenylamines) may be carried out in a batch, semi-continuous or continuous manner. The reaction may be conducted in a single reaction zone or in a plurality of reaction zones, in series or in parallel, the reaction may be conducted intermittently or continuously in an elongated tubular zone or in a series of such zones. The material construction of the equipment should be such as to be inert during the reaction. The equipment should also be able to withstand the reaction temperatures and pressures. The reaction zone can be fitted with internal and/or external heat exchanges to control temperature fluctuations. Preferably, an agitation means is available to ensure uniform reaction. Mixing induced by vibration, shaker, stirrer, rotating, oscillation, etc. are all illustrative of the types of agitation means which are contemplated for use in preparing the composition of the present invention. Such agitation means are available and well known to those skilled in the art.

The reaction product will contain various poly(oxydiphenylamines) of various molecular weights. For example, it is contemplated that with respect to the above formulae, various weight percentages of the reaction mixture may range from about 10% to about 100%. Use of the various mixtures of poly(oxydiphenylamine) in rubber compounds is contemplated herein.

The poly(oxydiphenylamine) may be added to sulfur vulcanizable elastomers as an additive. The term "rubber" or "elastomer" as used herein embraces both natural and all its various raw and reclaimed forms as well as various synthetic rubbers. Representative synthetic elastomers are the homopolymerization products of butadiene and its homologues and derivatives, as for example, methylbutadiene, dimethylbutadiene, chloroprene (neoprene synthetic rubber) and pentadiene as well as copolymers such as those formed from butadiene or its homologues or derivatives with other unsaturated organic compounds. Among the latter are acetylenes, e.g., vinyl acetylene; olefins, for example, isobutylene, which copolymerizes with isoprene to form butyl rubber; vinyl compounds, for example, vinyl chloride, acrylic acid, acrylonitrile (which polymerizes with butadiene to form NBR), methacrylic acid and styrene, the latter compound polymerizes with butadiene to form SBR, as well as vinyl esters and various unsaturated aldehydes, ketones and ethers, e.g., acrolein, methyl isopropenyl ketone and vinyl ethyl ether. Also included are the various synthetic rubbers prepared by the homopolymerization of isoprene and the copolymerization of isoprene with other diolefins and various unsaturated organic compounds. Additionally, included are the synthetic rubbers such as 1,4-cis polybutadiene and 1,4-cis polyisoprene and similar synthetic rubbers such as EPDM. The preferred rubbers for use with the poly(oxydiphenylamine) are SBR and polybutadiene or mixtures thereof.

The rubber vulcanizates containing the poly(oxydiphenylamine) may be used in the preparation of tires, motor mounts, rubber bushings, power belts, printing rolls, rubber shoe heels and soles, rubber floor tiles, caster wheels, elastomer seals and gaskets, conveyor belt covers, wringers, hard rubber battery cases, automobile floor mats, mud flaps for trucks, tires, ball mill liners and the like.

The poly(oxydiphenylamine) may be added to the vulcanizable elastomer in a variety of levels. Generally speaking, the concentration of the poly(oxydiphenylamine) ranges from about 0.1 parts per hundred rubber (phr) to 50 phr, preferably 0.1 phr to 10 phr, and is in intimate mixture with the elastomer. A particularly preferred range is when the poly(oxydiphenylamine) is at a concentration ranging from about 0.5 phr to about 5 phr.

The poly(oxydiphenylamine) may be compounded in either the productive or nonproductive stock. Preferably, the poly(oxydiphenylamine) is compounded in the nonproductive because uniform mixing is achieved. Incorporation of the poly(oxydiphenylamine) into the sulfur vulcanizable rubber may be accomplished by conventional means of mixing such by the use of a Banbury or Brabender.

Cure properties were determined using the Monsanto Oscillating Disc Rheometer which was operated at a temperature of 150° and at a frequency of 100 CPM. A description of Oscillating Disc Rheometers can be found in the Vanderbilt Handbook, edited by Robert O. Babbitt, Norwalk, Conn., R. T. Vanderbilt Company, Inc., 1978 (pages 583-591). The use of this cure meter and standardized values read from the curve are specified in ASTM D-2084. A typical cure curve obtained on an oscillating disc rheometer is shown on page 588 of the 1978 edition of the Vanderbilt Rubber Handbook.

In such an oscillating disc rheometer, compounded rubber samples are subjected to an oscillating shearing action of constant amplitude. The torque of the oscillating disc embedded in the stock that is being tested is required to oscillate the rotor at the vulcanization temperature. The values obtained using this cure test are very significant since changes in the rubber or the compounded recipe are very readily detected. It is obvious that it is normally advantageous to have a very fast cure rate. Some of the following tables report cure properties that were determined from cure curves that were obtained for the various rubber formulations that were prepared. The properties include minutes to 90% of torque increase (t90 min.).

Peel adhesion testing was done to determine the interfacial adhesion between various rubber formulations that were prepared. The interfacial adhesion was determined by pulling one compound away from another at a right angle to the untorn test specimen with the two ends being pulled apart at 180° angle to each other using an Instron machine. The area of contact was determined from placement of a Mylar sheet between the compounds during cure. A window in the Mylar allowed the two materials to come into contact with each other during curing and subsequent testing.

EXAMPLE 1

Preparation of Poly(oxy-4,4'-diphenylamine)

Poly(oxy-4,4'-diphenylamine) was prepared by charging a one-liter 3-neck round bottom flask with 93 grams (0.5 mole) of 4-hydroxydiphenylamine, 11 grams of p-toluene sulfonic acid and 97 ml of m-xylene. The mixture was heated to 205° C. for 24 hours, wherein 6 ml of water were removed. HPLC analysis showed the formation of oligomers. The crude product was a black crystalline solid melting at 67° C. with an acid number of 46. The molecular weight range was from about 370 to several thousand.

EXAMPLE 2

Four batches of poly(oxy-4,4'-diphenylamine) were prepared by this same procedure except different reaction temperatures were used. Each batch was prepared by charging a one-liter, 3-neck round bottom flask with 186 grams (1.0 mole) of 4-hydroxydiphenylamine, 22 grams of p-toluene sulfonic acid and 200 ml of m-xylene. The mixtures were heated to 160° C. (first batch), 180° C. (second batch), 200° C. (third batch), or 220° C. (fourth batch) for five hours. HPLC analysis showed formation of dimers and oligomers. The crude products were mostly dimers for the 160° C. (first batch) and up to about 10,000 molecular weight polymers in the 220° C. (fourth batch). The second and third batches contained crude mixtures of poly(oxydiphenylamine) oligomers.

EXAMPLE 3

Table I below shows the basic rubber compound that was used in this example. The rubber compound was prepared in a one stage Banbury mix. All parts and percentages are by weight unless otherwise noted.

The control had no poly(oxy-4,4'-diphenylamine) whereas, sample 1 contained 2 phr of poly(oxy-4,4'-diphenylamine). The poly(oxydiphenylamine) was prepared by the procedure of Example 1. The physical data for each sample is shown in Table II.

TABLE I

| Material | Weight Parts | Banbury Stage |
| --- | --- | --- |
| SBR | 50.00 | 1 |
| Polybutadiene | 50.00 | 1 |
| Carbon Black | 64.50 | 1 |
| Antiozonant/Antioxidant | 1.75 | 1 |
| Processing Materials | 34.90 | 1 |
| Zinc Oxide | 3.00 | 1 |
| Poly(oxydiphenylamine)[(1)] | 2.00 | 1 |
| Sulfur/Accelerator | 3.75 | 1 |

[(1)]Not used in control.

TABLE II

| | Control | Control plus 2 phr Poly(oxy-4,4'-diphenylamine |
| --- | --- | --- |
| t90 (min.) | 29.3 | 25.6 |
| Tensile Strength | 11.2 | 13.6 |
| % Elongation @ Break | 385 | 460 |
| Modulus 300% | 9.0 | 8.8 |
| Peel Adhesion | 63.5 | 83.8 |
| to Self | 61.9 | 70.6 |

The addition of 2 phr of poly(oxy-4,4'-diphenylamine) results in a substantial increase in peel adhesion, tensile strength, percent elongation at break.

EXAMPLE 4

Table III below shows the basic rubber compound that was used in this example. The rubber compound was prepared in a two stage Banbury mix. All parts and percentages are by weight unless otherwise noted.

The two controls had no poly(oxy-4,4'-diphenylamine) wherein the sample was prepared in accordance with Example 2 (namely Sample 1) at 160° C., Sample 2 at 180° C., Sample 3 at 200° C. and Sample 4 at 220° C. The physical data for the two controls and each sample are shown in Table IV.

TABLE III

| | Weight Parts | Banbury Stage |
| --- | --- | --- |
| Natural Rubber | 50 | 1 |
| SBR | 50 | 1 |
| Filler | 63.6 | 1 |
| Processing Oil | 19.5 | 1 |
| Stearic Acid | 2.0 | 1 |
| Zinc Oxide | 3.5 | 1 |
| Antioxidant | 2.95 | 1 |
| Poly(oxy-4,4'-diphenylamine) | Varied | 1 |
| Sulfur, Accelerator | 2.93 | 2 |

TABLE IV

Polyoxy Prepared at Different Reaction Temperatures Compounded Into a 50/50 NR/SBR Recipe

| | Control #1 | Control #2 | 160° C. | 180° C. | 200° C. | 220° C. |
| --- | --- | --- | --- | --- | --- | --- |
| Rheometer | | | | | | |
| Delta Torque | 25.8 | 23.5 | 23.4 | 24.1 | 23.5 | 25.3 |
| t90 (minutes) | 21.2 | 21.7 | 16.2 | 15.7 | 17.9 | 19.2 |
| Modulus at 300% (MPa) | 8.69 | 7.80 | 6.83 | 7.44 | 7.76 | 7.94 |
| Tensile Strength | 17.66 | 17.42 | 16.37 | 16.26 | 16.60 | 16.34 |
| Elongation at Break | 550 | 575 | 610 | 576 | 564 | 553 |
| Hardness | | | | | | |
| at Room Temperature | 56.2 | 53.4 | 56.7 | 57.1 | 55.7 | 57.7 |
| at 100° C. | 51.5 | 49.5 | 48.5 | 49.8 | 49.4 | 51.4 |
| Rebound | | | | | | |
| at Room Temperature | 51.1 | 51.8 | 47.3 | 48.9 | 48.8 | 48.6 |
| at 100° C. | 64.9 | 65.6 | 59.4 | 60.9 | 62.6 | 61.8 |
| Peel Adhesion | | | | | | |
| Ave. (150° C. cure) 28 minutes | 108.8 | 106.7 | 156.8 | 137.3 | 126.2 | 114.4 |

NOTE:
Control #1 is for the 160° C., 180° C., and the 220° C. samples tested. Control #2 and the 200° sample were mixed in a separate study.

What is claimed is:

1. A composition comprising (1) from about 0.1 phr to about 50 phr of a poly(oxydiphenylamine) of the formula:

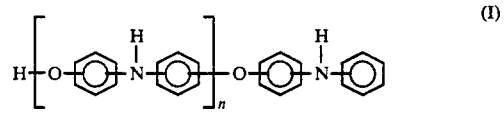

(I)

wherein n is an integer ranging from about 1 to 100, and (2) a sulfur vulcanized rubber.

2. The composition of claim 1 wherein the poly(oxydiphenylamine) is of the formula:

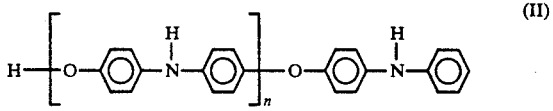

(II)

wherein n is an integer ranging from about 1 to about 100.

3. The composition of claim 1 wherein the rubber is selected from the group consisting of natural rubber, polychloroprene, polybutadiene, polyisoprene, butyl rubber, EPDM, styrene/butadiene copolymers, terpolymers of acrylonitrile, butadiene and styrene and blends thereof.

4. The composition of claim 1 wherein said poly(oxydiphenylamine) has a molecular weight from about 370 to 10,000.

5. The composition of claim 4 wherein said poly(oxydiphenylamine) has a molecular weight from about 370 to 1,000.

6. The composition of claim 1 wherein said poly(oxydiphenylamine) is present in an amount ranging from about 0.1 phr to about 10 phr.

7. The composition of claim 6 wherein said poly(oxydiphenylamine) is present in an amount ranging from about 0.5 phr to about 5 phr.

8. A process for improving the tear properties of a sulfur vulcanized rubber comprising adding from about 0.2 to about 10 phr of a poly(oxydiphenylamine) of the formula:

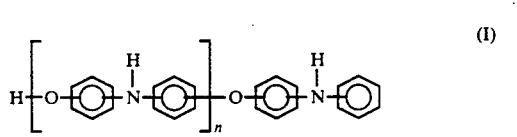

to a rubber selected from the group consisting of natural rubber, polychloroprene, polybutadiene, polyisoprene, butyl rubber, EPDM, styrene/butadiene copolymers, terpolymers of acrylonitrile, butadiene and styrene and blends thereof: wherein n is an integer of from 1 to 100.

9. The process of claim 8 wherein from about 0.5 to about 5 phr of a poly(oxydiphenylamine) is used.

* * * * *